United States Patent
Zhou (10) Patent No.: US 8,582,289 B2
(45) Date of Patent: Nov. 12, 2013

(54) DOCKING STATION AND ELECTRONIC DEVICE

(75) Inventor: Cong-Bing Zhou, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 148 days.

(21) Appl. No.: 13/205,652

(22) Filed: Aug. 9, 2011

(65) Prior Publication Data

US 2012/0275092 A1 Nov. 1, 2012

(30) Foreign Application Priority Data

Apr. 26, 2011 (CN) .......................... 2011 1 0105085

(51) Int. Cl.
*G06F 1/16* (2006.01)
*H05K 5/00* (2006.01)
*H05K 7/00* (2006.01)

(52) U.S. Cl.
USPC ...................................................... 361/679.41

(58) Field of Classification Search
None
See application file for complete search history.

(56) References Cited

U.S. PATENT DOCUMENTS

| | | | | |
|---|---|---|---|---|
| 5,390,515 A | * | 2/1995 | Essick | 70/63 |
| 5,408,382 A | * | 4/1995 | Schultz et al. | 361/679.41 |
| 5,552,957 A | * | 9/1996 | Brown et al. | 361/679.41 |
| 7,025,627 B2 | * | 4/2006 | Rosenthal et al. | 439/501 |
| 7,230,822 B2 | * | 6/2007 | Langberg et al. | 361/679.23 |
| 7,551,428 B2 | * | 6/2009 | Homer et al. | 361/679.41 |
| 7,567,431 B2 | * | 7/2009 | Brooks et al. | 361/679.06 |
| 7,808,779 B2 | * | 10/2010 | Lum et al. | 361/679.43 |
| 8,045,050 B2 | * | 10/2011 | Nogo et al. | 348/373 |
| 8,080,975 B2 | * | 12/2011 | Bessa et al. | 320/114 |
| 2009/0009957 A1 | * | 1/2009 | Crooijmans et al. | 361/686 |
| 2010/0062615 A1 | * | 3/2010 | Prest | 439/38 |

\* cited by examiner

*Primary Examiner* — Jinhee Lee
*Assistant Examiner* — Xanthia C Cunningham
(74) *Attorney, Agent, or Firm* — Altis & Wispro Law Group, Inc.

(57) ABSTRACT

A docking station includes a housing, and a connecting mechanism rotatably received in the housing. The connecting mechanism includes an interface. The connecting mechanism rotates from a first position exposed out of the housing to a second position hidden in the housing. When the connecting mechanism rotates to the first position, the interface is exposed out of the housing. When the connecting mechanism rotates to the second position, the interface is hidden in the housing.

13 Claims, 7 Drawing Sheets

DOCKING STATION AND ELECTRONIC DEVICE

BACKGROUND

1. Technical Field

The present disclosure relates to a docking station for an electronic device.

2. Description of Related Art

Many portable electronic devices, such as mobile phones, include a docking station for connecting and supporting the electronic device. The docking station usually includes a housing and an interface projecting out of the housing. The interface can be inserted into the electronic device, whereby the electronic device is electrically connected to the docking station. However, when the docking station is not being used, the interface is exposed out of the docking station and can become contaminated making the docking station unreliable when in use.

Therefore, there is room for improvement in the art.

BRIEF DESCRIPTION OF THE DRAWINGS

The components in the drawings are not necessarily drawn to scale, the emphasis instead being placed upon clearly illustrating the principles of the docking station. Moreover, in the drawings, like reference numerals designate corresponding parts throughout the several views.

DETAILED DESCRIPTION

Embodiments of the present disclosure will now be described in detail below, with reference to the accompanying drawings.

Figure 1:
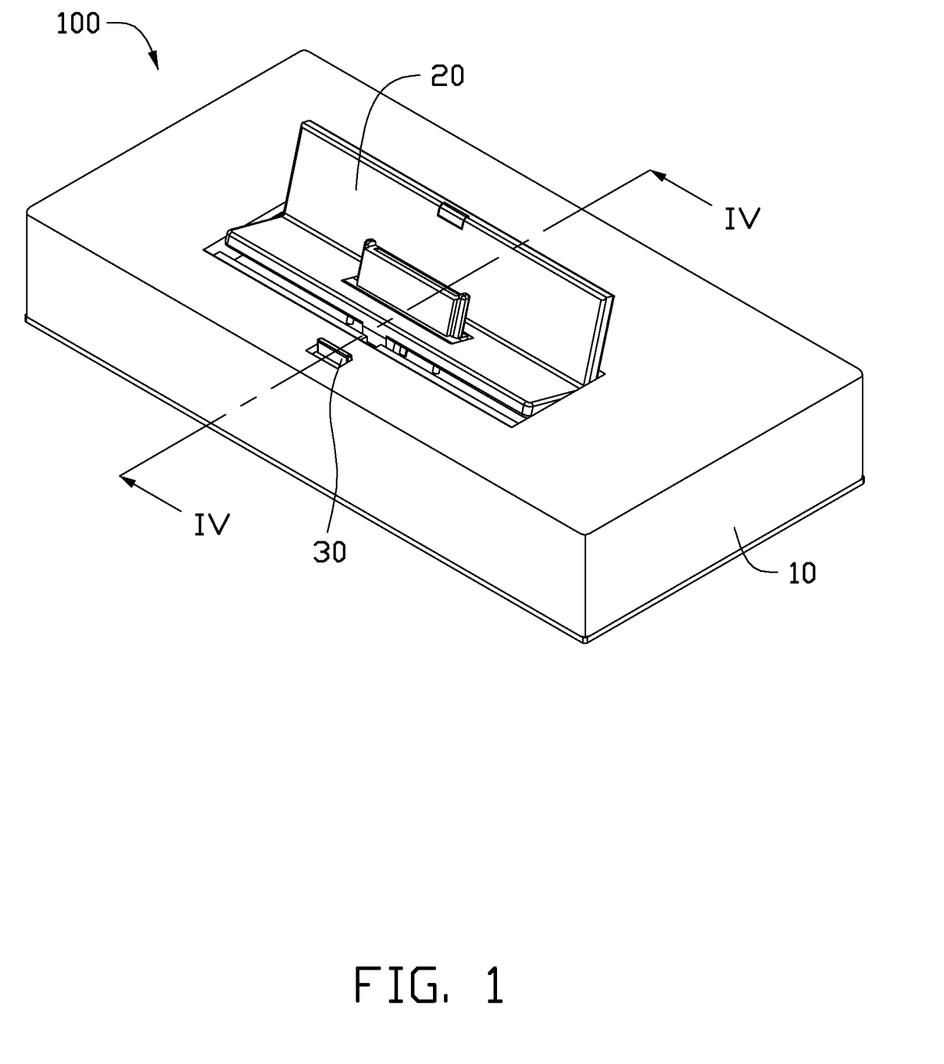
FIG. 1 is a perspective view of a docking station in accordance with an embodiment; the docking station is in a first state.

Referring to FIG. 1, a docking station 100 for supporting and electrically connecting an electronic device 200 (see FIG. 5) in accordance with an embodiment is shown. The docking station 100 includes a housing 10, a connecting mechanism 20 rotatably accommodated in the housing 10, and a locking mechanism 30 arranged in the housing 10. The connecting mechanism 20 supports and electrically connects the electronic device 200 (see FIG. 5). The connecting mechanism 20 is capable of rotating from a first position, exposed out of the housing 10 to a second position, hidden in the housing 10. The locking mechanism 30 latches the connecting mechanism 20 to the housing 10 when the connecting mechanism 20 is in the first position or in the second position. The electronic device 200 may be a mobile phone, a personal digital assistant (PDA), or a media player.

Figure 2:
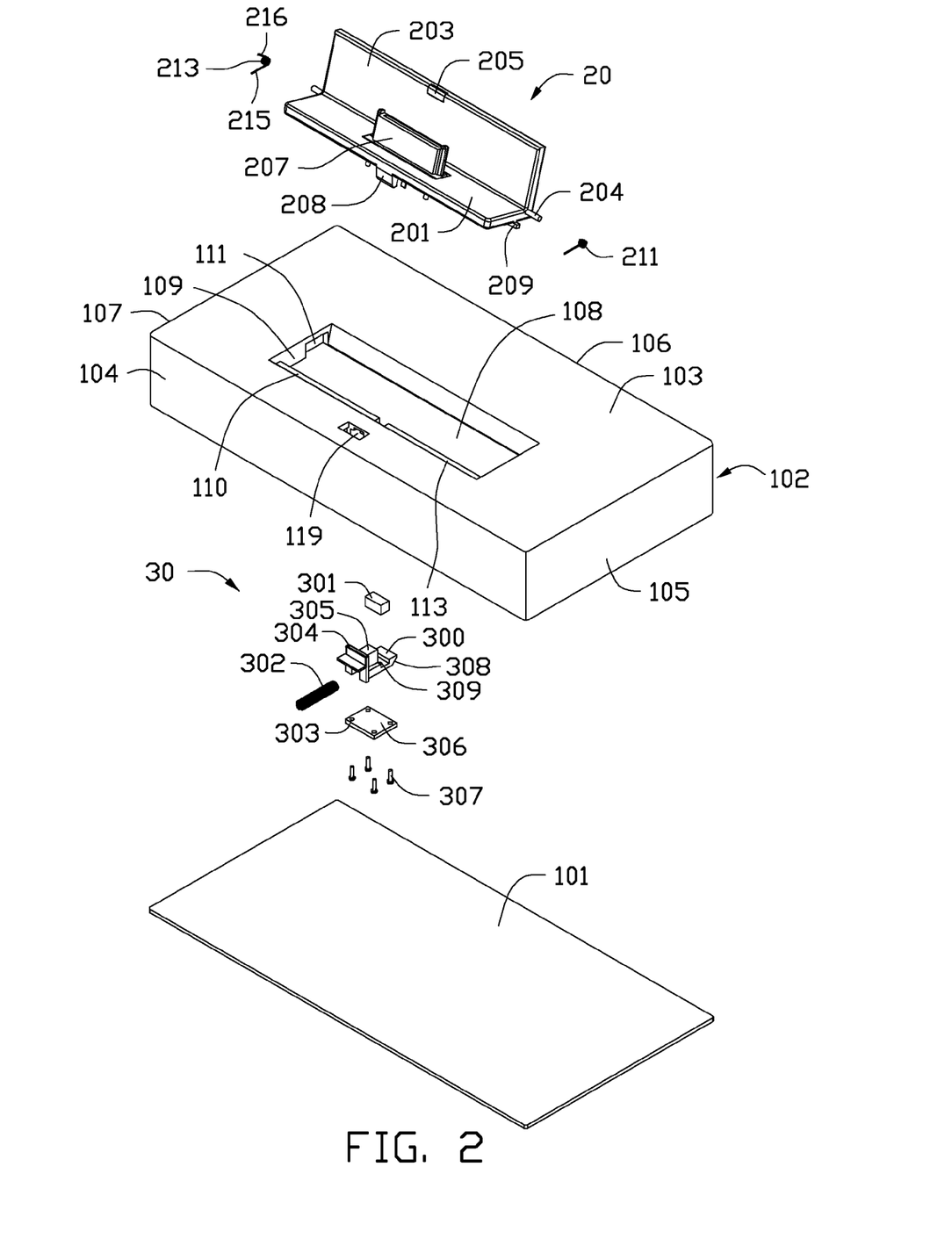
FIG. 2 is a disassembled perspective view of the docking station of FIG. 1.
Figure 3:
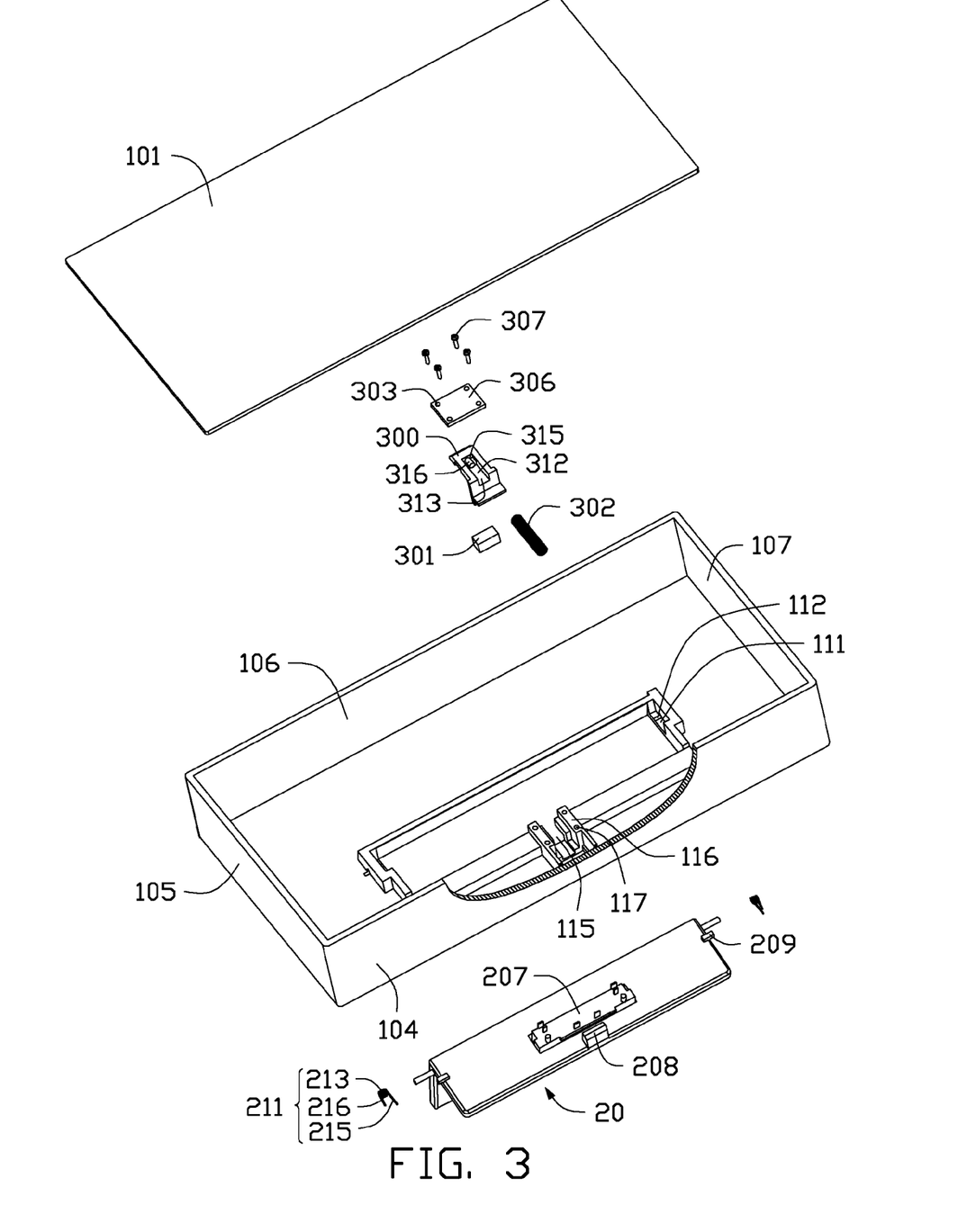
FIG. 3 is similar to FIG. 2, but viewed from another aspect.

Referring to FIGS. 2 and 3, the housing 10 is a substantially hollow rectangular parallelepiped. The housing 10 includes a bottom plate 101 and a body 102. The bottom plate 101 is detachable from the body 102. The body 102 includes a top plate 103 and four sidewalls (hereinafter, two opposite first sidewalls 104, 106 and two opposite second sidewalls 105, 107) projecting from the rims of the top plate 103. The top plate 103 is opposite to the bottom plate 101. The four sidewalls 104, 105, 106, 107 are successively connected.

An elongated first opening 108 is defined in the top plate 103. Part of the connecting mechanism 20 is exposed via the first opening 108 and part of the connecting mechanism 20 is hidden in the housing 10. The first opening 108 includes two opposite first sides 109 and two opposite second sides 110. The first and second sides 109, 110 are successively connected. Two opposite notches 111 are respectively defined in the first sides 109. A first axis hole 112 (see FIG. 3) is defined in the bottom of each notch 111, and extends in a direction perpendicular to the first side 109. One of the second sides 110 adjacent to the first sidewall 104 is step-shaped and includes a stopper 113 for stopping the connecting mechanism 20. A guiding groove 115 is defined in the second side 110 having the stopper 113 and communicates with the first opening 108. Two supporting parts 116 are mounted on an inner surface of the top plate 103 and are respectively arranged at opposite sides of the guiding groove 115. Each supporting part 116 defines two holes 117. The housing 10 further defines a receiving groove 119. The receiving groove 119 is adjacent to the first sidewall 104 and communicates with the guiding groove 115.

The connecting mechanism 20 includes a supporting portion 201, a cover 203 connected to the supporting portion 201, an interface 207 and two first elastic members 211. The cover 203 is substantially perpendicular to the supporting portion 201. The interface 207 is perpendicularly arranged at the supporting portion 201 and is substantially parallel to the cover 203. The interface 207 electrically connects with other electronic devices.

Two shafts 204 respectively protrude from opposite ends of the joint of the supporting portion 201 and the cover 203. The shafts 204 are rotatably received in the first axis holes 112, such that the connecting mechanism 20 is rotatably connected to the housing 10. A first magnetic member 205 is arranged on the cover 203. A locking part 208 protrudes from a rim of the supporting portion 201 opposite to the cover 203 and extends in a direction opposite to the interface 207. Two protrusions 209 respectively project from opposite ends of the supporting portion 201, and extend in a direction parallel to the shafts 204.

The two first elastic members 211 are respectively sleeved on the ends of the two shafts 204. In the embodiment, each first elastic member 211 is a torsion spring. Each first elastic member 211 includes a spring body 213, a first spring arm 215 and a second spring arm 216. The spring body 213 is spirally twined. The first spring arm 215 and the second spring arm 216 are respectively extended from the two opposite ends of the spring body 213 along a tangent line of the spring body 213. The first spring arm 215 of each first elastic member 211 is secured to the protrusion 209. The second spring arm 216 of each first elastic member 211 is secured to the first side 109. When the connecting mechanism 20 rotates to the first position by means of a force (not shown), the spring body 213 is elastically deformed, and the first elastic members 211 generate a torsion force. When the force is released, the torsion force generated by the first elastic members 211 drives the connecting mechanism 20 to return to the second position, and the first elastic members 211 rebound to an original state.

The locking mechanism 30 includes a latching member 300, a second magnetic member 301, a second elastic member 302, a driving member 304 fixed to the latching member 300, and a fixing plate 306.

The latching member 300 is slidably received in the guiding groove 115. The latching member 300 latches the connecting mechanism 20 to the housing 10 when the connecting mechanism 20 rotates to the first position and the second position. The latching member 300 includes a guiding member 305 fixed to the driving member 304. The guiding member 305 is slidably received in the guiding groove 115. An end of the latching member 300 opposite to the driving member 304 defines an inclined surface 308. The latching member 300 further defines a recess 309. The recess 309 is adjacent to the guiding member 305 and receives the second magnetic member 301.

An elongated groove 312 is defined in a side of the latching member 300 opposite to the guiding member 305. The groove 312 extends through the driving member 304 to form a second opening 313. A post 316 protrudes from an end wall of the groove 312 opposite to the driving member 304.

One end of the second elastic member 302 is sleeved on the post 316, and another end of the second elastic member 302 resists against the first sidewall 104 of the housing 10. The second elastic member 302 provides an elastic force to hold the latching member 300 in a latched position where the connecting mechanism 20 is latched to the housing 10.

The driving member 304 is slidably received in the receiving groove 119. A portion of the driving member 304 extends out of the outer surface of the top plate 103. The driving member 304 drives the latching member 300 to slide along the guiding groove 115 in a direction opposite to the first opening 108, and the second elastic member 302 is pressed to be elastically deformed. In the embodiment, when the latching member 300 is in the latching position, the driving member 304 slides to an end of the receiving groove 119 adjacent to the first opening 108.

The fixing plate 306 is fixed to the supporting parts 116 by means of fixing members, such as, bolts and screws 307, such that the latching member 300 is sandwiched between the fixing plate 306 and the top plate 103. The fixing plate 306 defines four second axis holes 303. The bolts 307 pass through the second axis holes 303 of the fixing plate 306 and the holes 117 of the supporting part 116 to fix the fixing plate 306 to the housing 10. The fixing plate 306 is fixed to the supporting part 116 to limit the movement of the latching member 300.

In assembly, firstly, the two first elastic members 211 are respectively sleeved on the ends of the two shafts 204, and the first spring arm 215 of each first elastic member 211 is secured to the protrusion 209. The ends of the two shafts 204 are respectively received in the first axis holes 112. Secondly, the latching member 300 is received in the guiding groove 115 with the driving member 304 received in the receiving groove 119, and the second magnetic member 301 is received in the recess 309 with one end of the second elastic member 302 sleeved on the post 316 and the other end resisting against the first sidewall 104. Then, the bolts 307 pass through the four second axis holes 303 of the fixing plate 306 and thread into the holes 117 of the supporting part 116 to fix the fixing plate 306 to the housing 10. Finally, the bottom plate 101 is fixed to the body 102.

Figure 4:
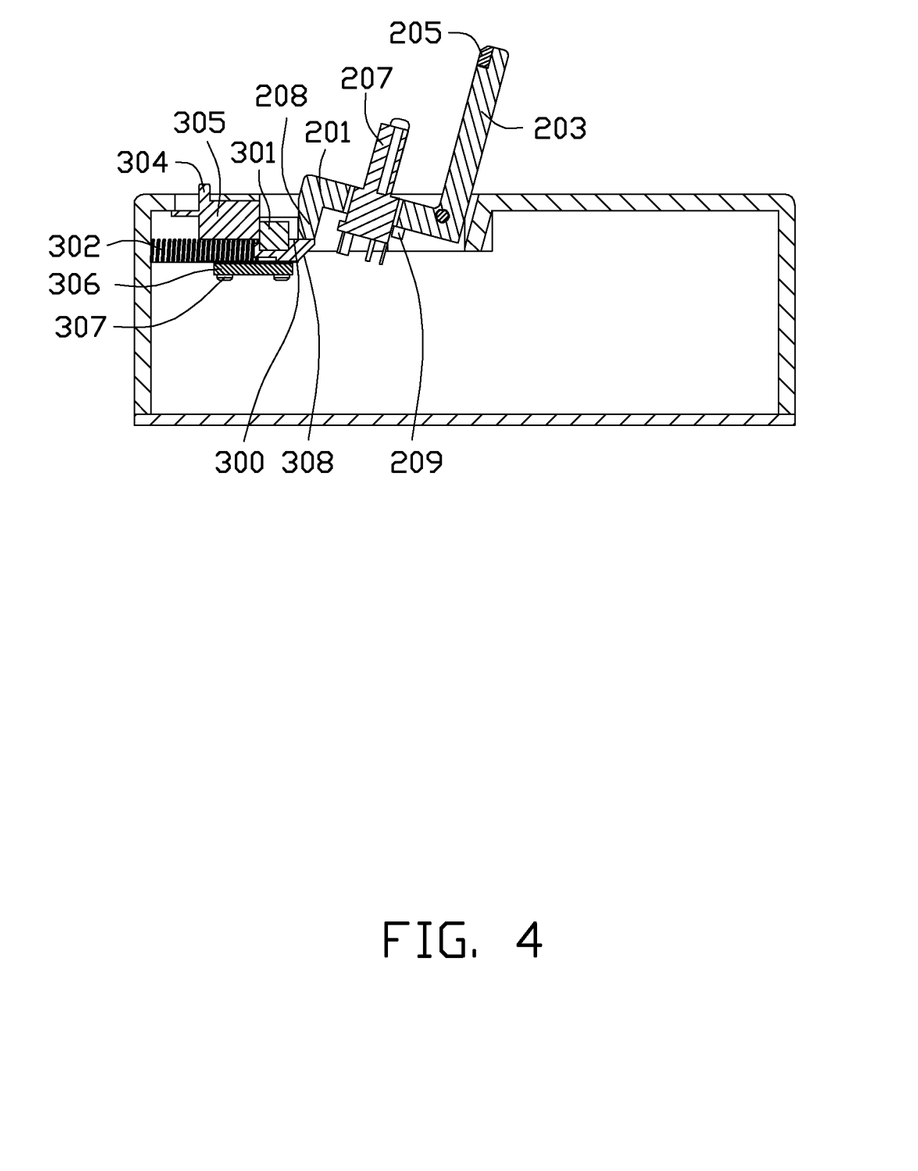
FIG. 4 is a cross-sectional view taken along line IV-IV of FIG. 1.
Figure 5:
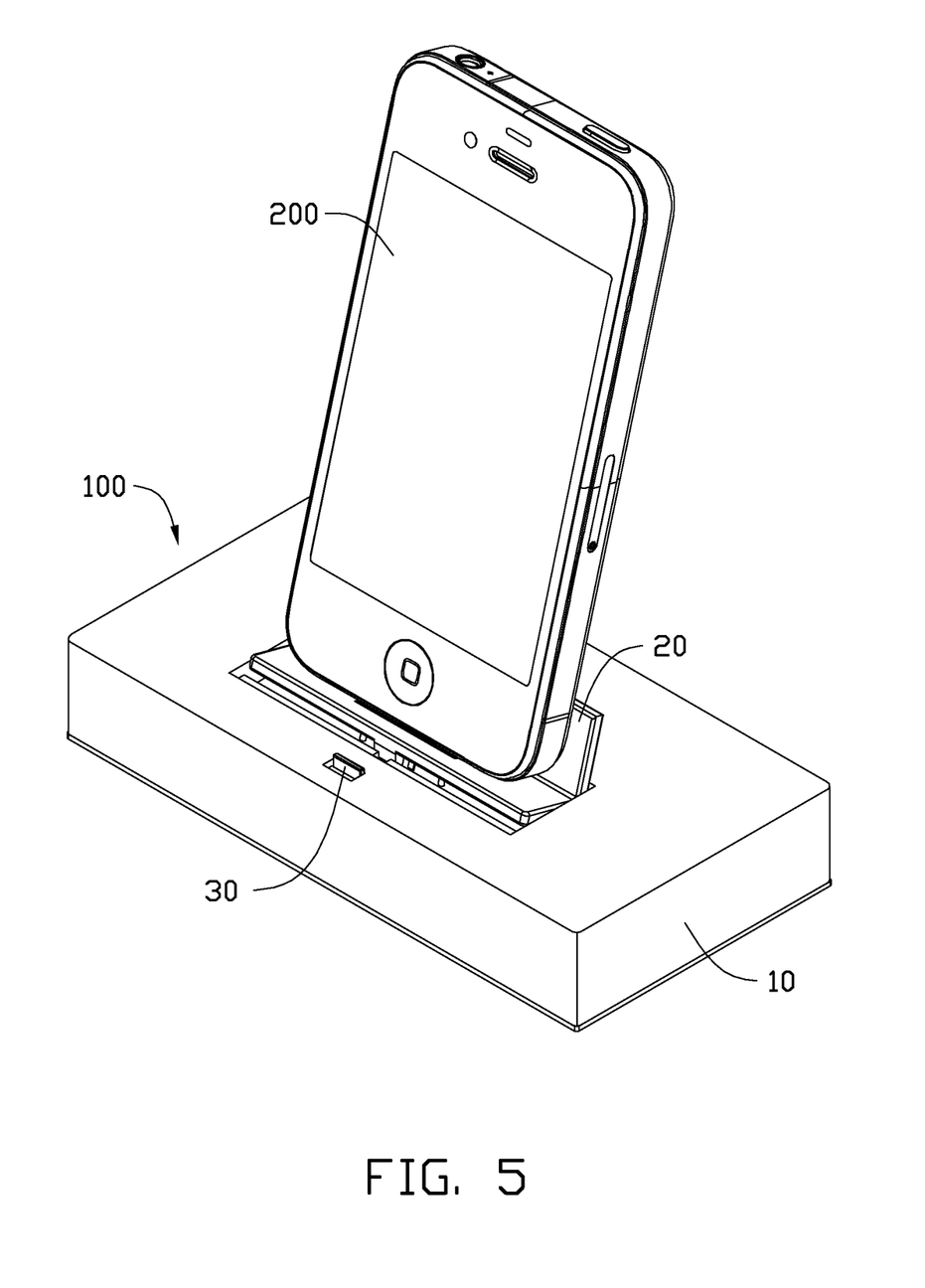
FIG. 5 is a perspective view showing the docking station of FIG. 1 supports an electronic device.

Again referring to FIG. 1, in use, the connecting mechanism 20 rotates to the first position with the cover 203 and the interface 207 exposed out of the docking station 100, and is positioned by the locking mechanism 30. Referring further to FIG. 4, in this state, the second elastic member 302 is in an original state, the latching member 300 extends out of the guiding groove 115, and the locking part 208 is supported by the latching member 300 to stop the connecting mechanism 20 overturning downwardly. The first elastic members 211 elastically deform. Referring also to FIG. 5, the electronic device 200 is electrically connected to the docking station 100 by being inserted in the interface 207, and is further supported by the cover 203.

Figure 6:
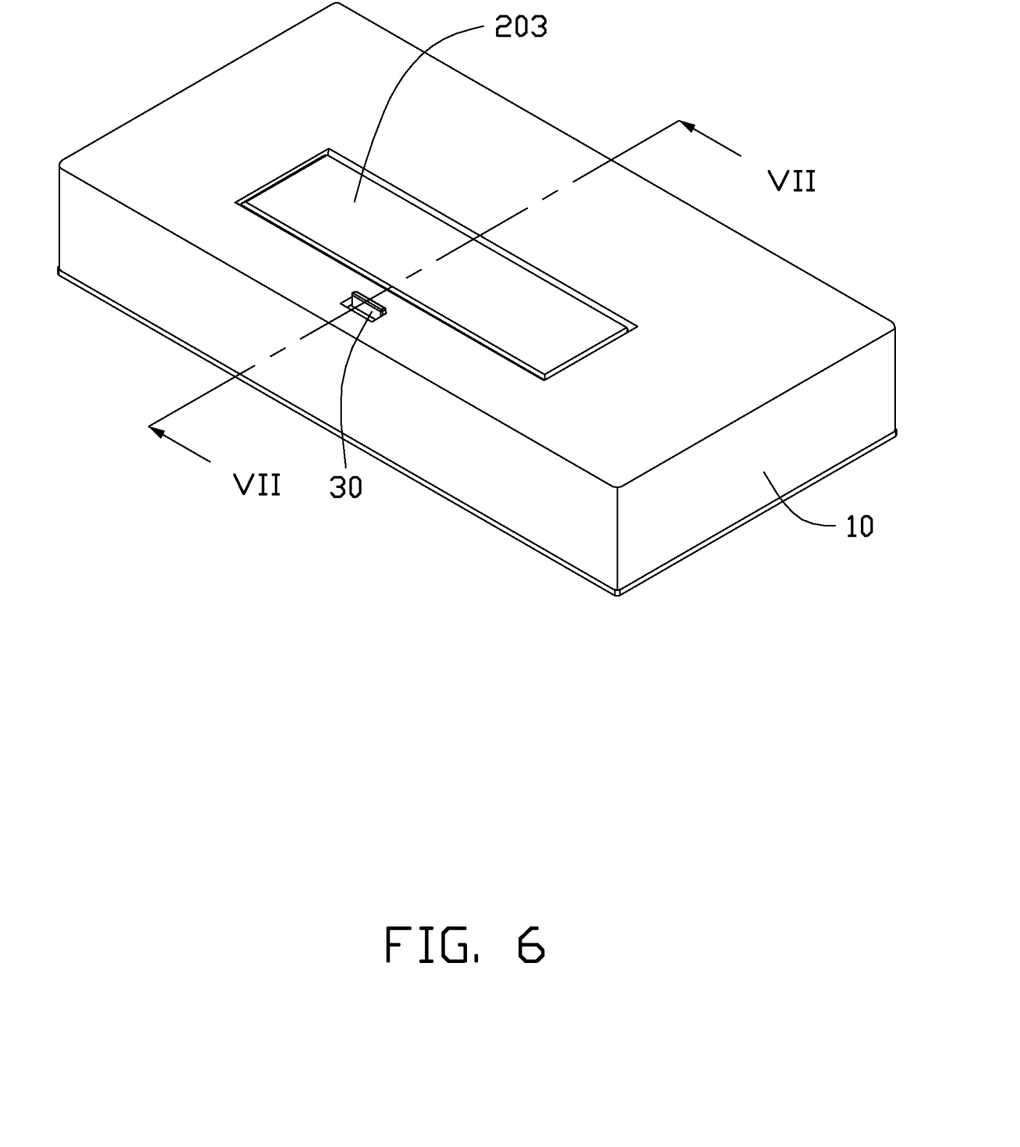
FIG. 6 is a perspective view of the docking station of FIG. 1 being in a second state.
Figure 7:
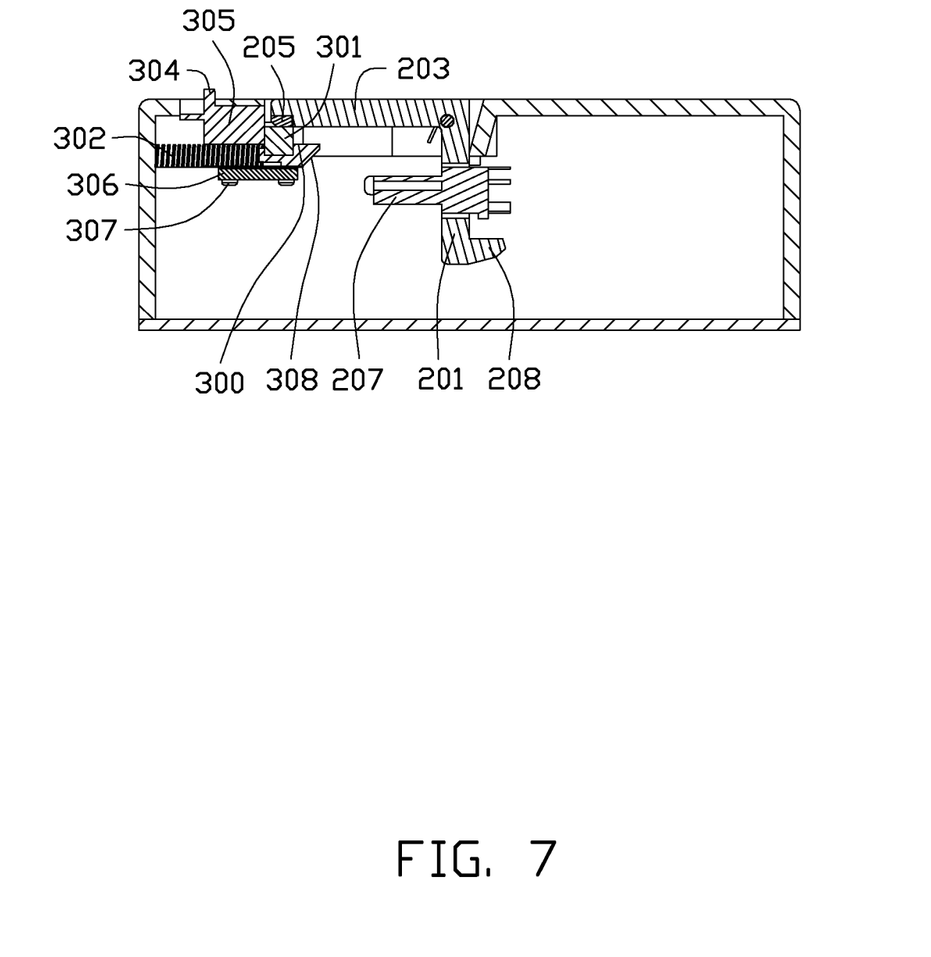
FIG. 7 is a cross-sectional view taken along line VII-VII of FIG. 6.

Referring to FIGS. 6 and 7, when the docking station 100 is not being used. The driving member 304 operates to drive the latching member 300 to slide into the guiding groove 115, the locking part 208 is detached from the latching member 300, and the two first elastic members 211 are released to drive the connecting mechanism 20 to be received in the housing 10 with the interface 207 hidden. Furthermore, because the second magnetic member 301 attracts the first magnetic member 205, the cover 203 is retained in the first opening 108 coplanar with the top plate 103.

With assistance of the docking station 100, the interface 207 is hidden in the docking station 100 to protect the interface 207 from contaminants.

While various embodiments have been described and illustrated, the disclosure is not to be constructed as being limited thereto. Various modifications can be made to the embodiments by those skilled in the art without departing from the true spirit and scope of the disclosure as defined by the appended claims.

What is claimed is:

1. A docking station for electrically connecting and supporting an electronic device comprising:
   a housing, and
   a connecting mechanism rotatably received in the housing, the connecting mechanism capable of rotating from a first position exposed out of the housing to a second position hidden in the housing,
   wherein the connecting mechanism comprises a supporting portion, a cover connected to the supporting portion, and an interface for electrically connecting and supporting the electronic device, the interface is arranged at the supporting portion and is substantially parallel to the cover, when the connecting mechanism rotates to the first position, the interface is exposed out of the housing, and when the connecting mechanism rotates to the second position, the interface is hidden in the housing, two shafts respectively protrude from opposite ends of the joint of the supporting portion and the cover, the connecting mechanism is rotatably connected to the housing via the two shafts, the connecting mechanism further comprises at least one first elastic member, the at least one first elastic member sleeves on the shafts for providing a torsion force to drive the connecting mechanism return from the first position to the second position.

2. The docking station of claim 1, wherein each first elastic member is a torsion spring.

3. The docking station of claim 2, wherein at least one protrusion respectively projects from an end of the supporting portion and extends in a direction parallel to the shafts, one end of each first elastic member is secured to the at least one protrusion, and the other end of each first elastic member is secured to the housing.

4. The docking station of claim 1, wherein the docking station further comprises a locking mechanism configured to lock the connecting mechanism when the connecting mechanism rotates to the first position and the second position.

5. The docking station of claim 4, wherein the locking mechanism comprises a latching member, the latching member is slidably mounted to the housing and is configured to lock the connecting mechanism in the first position and in the second position.

6. The docking station of claim 5, wherein the locking mechanism further comprises a second elastic member, the second elastic member is secured to the latching member and is configured to provide an elastic force for driving the latching member to lock the connecting mechanism in the first position and in the second position.

7. The docking station of claim 6, wherein the locking mechanism further comprises a driving member secured to the latching member, the driving member is configured to drive the latching member to detach from the connecting mechanism.

8. The docking station of claim 7, wherein the connecting mechanism comprises a first magnetic member, the locking mechanism further comprises a second magnetic member corresponding to the first magnetic member, the second magnetic member attracts the first magnetic member to make the connecting mechanism being positioned at the second position.

9. The docking station of claim 1, wherein the housing defines an opening, part of the connecting mechanism is exposed via the opening and part of the connecting mechanism is hidden in the housing.

10. A docking station for electrically connecting and supporting an electronic device comprising:
a housing;
a supporting portion;
a cover connected to the supporting portion; and
an interface rotatably coupled to the housing for electrically connecting and supporting the electronic device, the interface arranged at the supporting portion and substantially parallel to the cover, and the interface cooperating with the cover to support the electronic device, the interface capable of being rotated from a first state being exposed out of the housing to a second state being hidden in the housing;
wherein two shafts respectively protrude from opposite ends of the joint of the supporting portion and the cover, the supporting portion is rotatably connected to the housing via the two shafts, at least one first elastic member sleeves on the shafts for providing a torsion force to drive the interface return from the first state to the second state.

11. The docking station of claim 10, wherein each first elastic member is a torsion spring.

12. The docking station of claim 10, further comprising a locking mechanism, the locking mechanism configured to lock the supporting portion to position the interface when the interface is in the first state and the second state.

13. The docking station of claim 10, wherein the housing defines an opening, part of the supporting portion, the cover and the interface is exposed via the opening and part of the supporting portion, the cover and the interface is hidden in the housing.

* * * * *